United States Patent
Dai et al.

(10) Patent No.: US 11,551,673 B2
(45) Date of Patent: Jan. 10, 2023

(54) INTERACTIVE METHOD AND DEVICE OF ROBOT, AND DEVICE

(71) Applicant: BEIJING BAIDU NETCOM SCIENCE AND TECHNOLOGY CO., LTD., Beijing (CN)

(72) Inventors: Jun Dai, Beijing (CN); Ying Liu, Beijing (CN)

(73) Assignee: BEIJING BAIDU NETCOM SCIENCE AND TECHNOLOGY CO., LTD., Beijing (CN)

(*) Notice: Subject to any disclaimer, the term of this patent is extended or adjusted under 35 U.S.C. 154(b) by 68 days.

(21) Appl. No.: 16/396,142

(22) Filed: Apr. 26, 2019

(65) Prior Publication Data

US 2020/0005772 A1    Jan. 2, 2020

(30) Foreign Application Priority Data

Jun. 28, 2018 (CN) .......................... 201810686130.3

(51) Int. Cl.
    *G10L 15/18* (2013.01)
    *G10L 13/027* (2013.01)
    *G10L 15/22* (2006.01)

(52) U.S. Cl.
    CPC ........ *G10L 15/1815* (2013.01); *G10L 13/027* (2013.01); *G10L 15/1822* (2013.01); *G10L 15/22* (2013.01); *G10L 2015/223* (2013.01)

(58) Field of Classification Search
    CPC ...... H04M 3/5233; G06F 3/017; G10L 15/22; G10L 15/1815; G10L 15/1822; G10L 13/027; G10L 2015/223
    See application file for complete search history.

(56) References Cited

U.S. PATENT DOCUMENTS

| | | | | |
|---|---|---|---|---|
| 6,795,808 | B1* | 9/2004 | Strubbe | G10L 15/1822 704/275 |
| 10,178,218 | B1* | 1/2019 | Vadodaria | H04W 4/50 |
| 10,332,297 | B1* | 6/2019 | Vadodaria | G06F 3/0486 |
| 2009/0030800 | A1* | 1/2009 | Grois | G06Q 30/0277 705/14.52 |
| 2009/0275408 | A1* | 11/2009 | Brown | G10L 13/00 463/35 |

(Continued)

FOREIGN PATENT DOCUMENTS

CN          105513593 A      4/2016

OTHER PUBLICATIONS

Chinese Patent Application No. 201810686130.3 Office Action dated Apr. 22, 2021, 8 pages.

(Continued)

*Primary Examiner* — Anne L Thomas-Homescu
(74) *Attorney, Agent, or Firm* — Lathrop GPM LLP (57) ABSTRACT

Embodiments of the present disclosure provide an interactive method of a robot, an interactive device of a robot and a device. The method includes: obtaining voice information input by an interactive object, and performing semantic recognition on the voice information to obtain a conversation intention; obtaining feedback information corresponding to the conversation intention based on a conversation scenario knowledge base pre-configured by a simulated user; and converting the feedback information into a voice of the simulated user, and playing the voice to the interactive object.

9 Claims, 5 Drawing Sheets

(56) References Cited

U.S. PATENT DOCUMENTS

| | | | |
|---|---|---|---|
| 2010/0304342 A1* | 12/2010 | Zilber | G10L 15/26 434/157 |
| 2012/0007806 A1 | 1/2012 | Liu | |
| 2014/0244712 A1* | 8/2014 | Walters | G06F 3/167 709/202 |
| 2014/0317502 A1* | 10/2014 | Brown | G06F 9/453 715/706 |
| 2015/0220244 A1* | 8/2015 | Vats | G06F 3/011 715/850 |
| 2015/0301592 A1* | 10/2015 | Miller | G06F 3/016 345/156 |
| 2017/0068551 A1* | 3/2017 | Vadodaria | G06F 3/167 |
| 2017/0124770 A1* | 5/2017 | Vats | G06T 19/003 |
| 2017/0160813 A1* | 6/2017 | Divakaran | G10L 15/1815 |
| 2017/0337478 A1* | 11/2017 | Sarikaya | G06F 3/167 |
| 2018/0096283 A1* | 4/2018 | Wang | G06Q 10/063112 |
| 2018/0115645 A1* | 4/2018 | Iyer | G06Q 10/063112 |
| 2018/0174347 A1* | 6/2018 | Chaney | H04N 7/157 |
| 2018/0277117 A1* | 9/2018 | Hergenroeder | G09B 19/04 |
| 2018/0314689 A1* | 11/2018 | Wang | G10L 15/22 |
| 2019/0043472 A1* | 2/2019 | Garcia | G10L 21/003 |
| 2019/0066687 A1* | 2/2019 | Wood | G10L 15/30 |
| 2019/0116136 A1* | 4/2019 | Baudart | G06N 3/006 |
| 2019/0213269 A1* | 7/2019 | Georges | G06F 16/9566 |
| 2019/0354252 A1* | 11/2019 | Badr | G06F 3/167 |
| 2019/0370397 A1* | 12/2019 | Kummamuru | G06F 16/3334 |

OTHER PUBLICATIONS

Chinese Patent Application No. 201810686130.3 English translation of Office Action dated Apr. 22, 2021, 15 pages.

* cited by examiner

INTERACTIVE METHOD AND DEVICE OF ROBOT, AND DEVICE

CROSS REFERENCE TO RELATED APPLICATION

This application is based on and claims priority to Chinese Patent Application No. 201810686130.3, filed with the National Intellectual Property Administration of P. R. China on Jun. 28, 2018, the entire contents of which are incorporated herein by reference.

FIELD

Embodiments of the present disclosure relate to the field of artificial intelligence, and more particularly to, an interactive method of a robot, an interactive device of a robot, and a device.

BACKGROUND

Artificial Intelligence (AI) is a new technical science relating to the theories, methods, techniques and application systems for simulating, extending and expanding human intelligence. Artificial intelligence is a branch of computer science, which attempts to understand the essence of intelligence and to produce an intelligent robot capable of acting like a human. Research in AI may cover fields such as robots, speech recognition, image recognition, natural language processing, expert systems, among others.

In the related art, certain robots are capable of applying certain biological features for a particular scenario, such as Zhiling Lin's (a Chinese actress) voice navigation of Amap which provides navigation services for users by voice synthesis technology, or family companion robots which record parent's voices to tell stories to children, etc. These robots have limited interactive capabilities, and at present, most robots cannot simulate a character to interact with an interactive object with a high degree of freedom.

SUMMARY

Embodiments of the present disclosure provide an interactive method of a robot. The method includes: obtaining voice information input by an interactive object, and performing semantic recognition on the voice information to obtain a conversation intention; obtaining feedback information corresponding to the conversation intention based on a conversation scenario knowledge base pre-configured by a simulated user; and converting the feedback information into a voice of the simulated user, and playing the voice to the interactive object.

Embodiments of the present disclosure provide an electronic device. The electronic device includes a processor and a memory. The processor is configured to run a program corresponding to the executable program codes by reading executable program codes stored in the memory, to perform the interactive method of a robot according to embodiments of the present disclosure.

Embodiments of the present disclosure provide a non-transitory computer readable storage medium having stored a computer program thereon. When the computer program is executed by a processor, the interactive method of a robot according to embodiments of the present disclosure is performed.

Additional aspects and advantages of embodiments of present disclosure will be given in part in the following descriptions, become apparent in part from the following descriptions, or be learned from the practice of the embodiments of the present disclosure.

DETAILED DESCRIPTION

Embodiments of the present disclosure will be described in detail and examples of embodiments are illustrated in the drawings. The same or similar elements and the elements having the same or similar functions are denoted by like reference numerals throughout the descriptions. Embodiments described herein with reference to drawings are explanatory, serve to explain the present disclosure, and are not construed to limit embodiments of the present disclosure.

The interactive method of a robot, the interactive device of a robot and the electronic device according to embodiments of the present disclosure will be described below with reference to the accompanying drawings.

Figure 1:
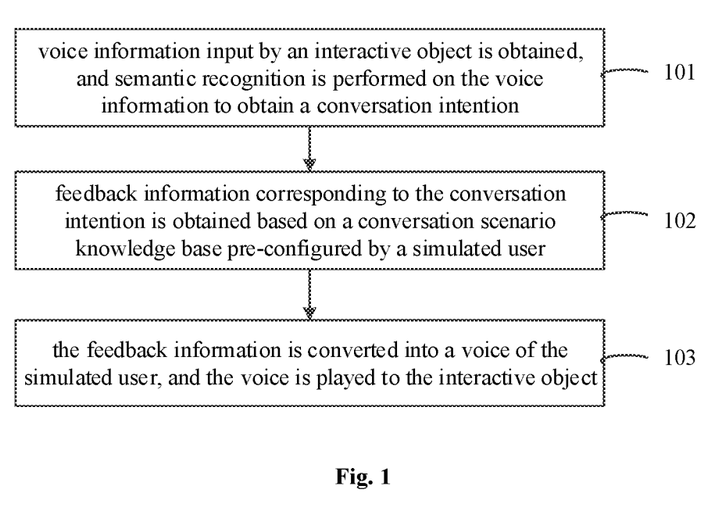
FIG. 1 is a flow chart of an interactive method of a robot according to an embodiment of the present disclosure.

FIG. 1 is a flow chart of an interactive method of a robot according to an embodiment of the present disclosure. As illustrated in FIG. 1, the method may include the following.

At block 101, voice information input by an interactive object is obtained, and semantic recognition is performed on the voice information to obtain a conversation intention.

In an embodiment of the present disclosure, when the robot interacts with the interactive object, the voice information input by the interactive object needs to be obtained, and the conversation intention can be obtained based on the voice information.

In an embodiment of the present disclosure, the voice information input by the interactive object may be obtained by voice recognition technology. For example, a voice recognition model may be pre-trained, and then, by receiving the voice signal from the interactive object, extracting corresponding feature information, and inputting the feature information into the voice recognition model for matching, the voice information input by the interactive object can be obtained.

Moreover, after the voice information input by the interactive object is obtained, semantic recognition may be performed on the voice information to obtain the conversation intention.

In an embodiment of the present disclosure, the voice information may be recognized and analyzed by natural language processing technology to obtain the conversation intention. For example, by performing semantic recognition on voice information "hello", the conversation intention can be obtained as a greeting.

In an embodiment of the present disclosure, the semantic recognition model may be trained based on the conversation scenario, and the voice information can be recognized and analyzed based on the semantic recognition model to obtain the conversation intention. For example, when the conversation scenario is a teaching scenario, the corresponding sample training data can be obtained based on the teaching scenario, and the semantic recognition model can be trained based on the sample training data. When the robot interacts with the interactive object in the teaching scenario, the voice information can be recognized and analyzed based on the corresponding semantic recognition model to obtain the conversation intention. Thus, the calculation complexity of training the model can be reduced, and personalization degree of the product can be improved.

The voice recognition model and the semantic recognition model may be a deep learning model.

It should be noted that, the above manners of performing semantic recognition on the voice information to obtain the conversation intention are merely exemplary, the conversation intention may be obtained in other manners, and is not limited herein.

At block 102, feedback information corresponding to the conversation intention is obtained based on a conversation scenario knowledge base pre-configured by a simulated user.

In an embodiment of the present disclosure, the conversation scenario knowledge base may be pre-configured locally on devices or on cloud servers, and the related knowledge can be stored in the conversation scenario knowledge base. When the robot interacts with the interactive object, the knowledge in the conversation scenario knowledge base may be retrieved based on the conversation intention, and feedback information can be generated based on the retrieved knowledge.

For example, in the teaching scenario, the knowledge such as the course content, the teaching animation can be stored in the teaching scenario knowledge base, when the robot simulates the teacher to interact with the student, the voice information input by the student can be obtained and semantic recognition can be performed on the voice information to obtain the conversation intention of the student, and then the course content in the teaching scenario knowledge base can be retrieved based on the conversation intention, and the feedback information can be generated based on the retrieved course content.

The related knowledge may be set by the simulated user. The related knowledge may be in the form of text, pictures, videos, etc., which is not limited herein.

In an embodiment of the present disclosure, in order to highly simulate the simulated user, the conversation data of the simulated user may be used as sample data to train the conversation model. After the conversation intention is obtained, the feedback information corresponding to the conversation intention can be obtained based on the conversation scenario knowledge base pre-configured by the simulated user and the pre-trained conversation model, such that the robot can simulate the conversation mode of the simulated user to interact with the interactive object.

It should be noted that, the conversation model may be trained based on the sample data, or the conversation model may be directly configured by the simulated user.

At block 103, the feedback information is converted into a voice of the simulated user, and the voice is played to the interactive object.

In an embodiment of the present disclosure, the voice audio file of the simulated user may be pre-recorded for the conversation scenario and stored in the fixed-scenario voice base, to support the interaction of the fixed scenario. When the robot interacts with the interactive object in the fixed scenario, the fixed-scenario voice base pre-recorded by the simulated user may be queried to obtain the audio file of the feedback information, and then the audio file can be played to the interactive object.

In an implementation manner, a mapping relationship table between the feedback information and the audio file may be set, and the audio file corresponding to the feedback information can be obtained by querying the mapping relationship table.

The format of the audio file includes, but is not limited to, mp3, WAV, etc., and is not limited herein.

In an embodiment of the present disclosure, the voice segment of the simulated user may be obtained, and the conversation-scenario voice base may be trained by voice synthesis technology (such as TTS (Text to Speech) voice technology), to support the interaction of the scenario of high freedom degree. When the robot interacts with the interactive object, the conversation-scenario voice base pre-trained by the simulated user can be queried, the audio file of the feedback information can be converted based on the feedback information and voice information in the conversation-scenario voice base, and the audio file can be played to the interactive object.

It should be noted that, the implementation manner of converting the feedback information into the voice of the simulated user and playing the voice to the interactive object is merely exemplary, and the user may arbitrarily select or combine the implement manner according to actual needs, and is not limited herein.

In the embodiment, by converting the voice of the simulated user, performing conversation configuration and configuring the conversation scenario knowledge base, the robot can highly simulate the simulated user in the voice, the conversation mode, and the knowledge base, the personalization degree of robot customization can be improved. With the interactive method of a robot according to embodiments of the present disclosure, the conversation intention of the interactive object can be intelligently recognized, the feedback information can be intelligently obtained and fed back, the high degree of freedom of interaction between the robot and the interaction object can be achieved.

In view of the above, with the interactive method of a robot according to embodiments of the present disclosure, by obtaining the voice information input by the interactive object, semantic recognition is performed on the voice information to obtain the conversation intention, the feedback information corresponding to the conversation intention is obtained based on the conversation scenario knowledge base pre-configured by the simulated user, and the feedback information is converted into the voice of the simulated user, and the voice is played to the interactive object. Thus, by highly simulating the simulated user in the voice, the conversation manner and the knowledge base, the robot can highly simulate a specific character, and by intelligently recognizing the conversation intention of the interactive object and intelligently obtaining feedback information for feedback, the freedom degree and the intelligence of the robot interaction can be improved.

Figure 2:
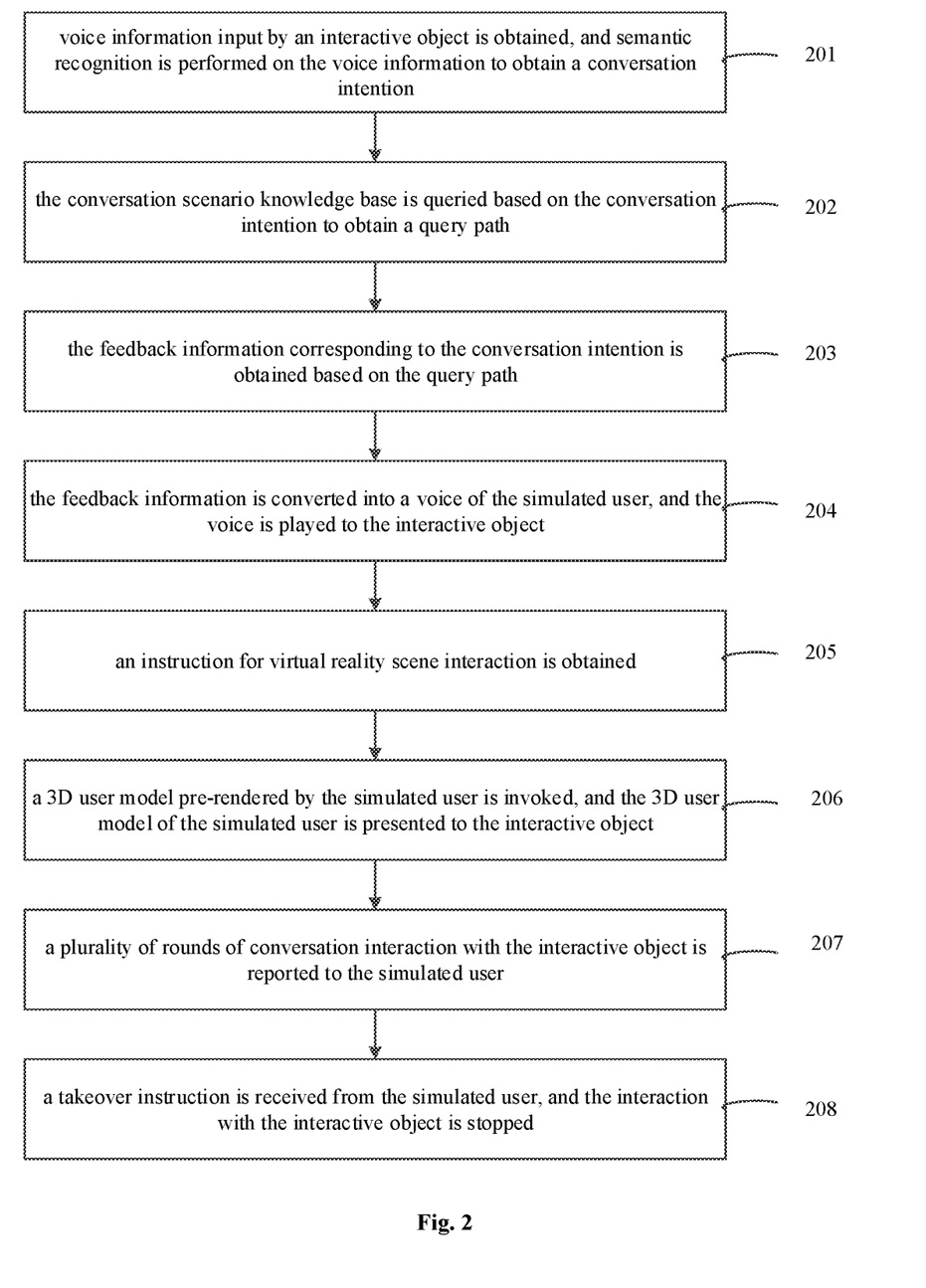
FIG. 2 is a flow chart of an interactive method of a robot according to another embodiment of the present disclosure.

FIG. 2 is a flow chart of an interactive method of a robot according to an embodiment of the present disclosure, as illustrated in FIG. 2, the method may include the following.

At block 201, voice information input by an interactive object is obtained, and semantic recognition is performed on the voice information to obtain a conversation intention.

It should be noted that, the explanation of the foregoing embodiments for block 101 may also be applicable to that of block 201, and details are not described herein again.

At block 202, the conversation scenario knowledge base is queried based on the conversation intention to obtain a query path.

In at least one embodiment, the query path may be set in the conversation scenario knowledge base, and by matching the conversation intention with the query path, the matched query path can be obtained.

The query path may be a preset path or an external path, and can be set according to requirements, which is not limited herein.

At block 203, the feedback information corresponding to the conversation intention is obtained based on the query path.

In an example, when the query path shows the preset path, structured knowledge related to user characteristics and pre-configured by the simulated user can be queried, and the feedback information corresponding to the conversation intention can be obtained.

The structured knowledge related to the user characteristics may be set according to needs. For example, the teacher can pre-configure the course content, and the star can pre-configure his/her personal information.

In another example, when the query path shows the preset path, rich media knowledge pre-configured by the simulated user can be queried, and the feedback information corresponding to the conversation intention can be obtained.

The rich media knowledge includes, but is not limited to, the picture, the video, and the like.

In actual applications, there may be cases where the knowledge queried based on the preset path may not satisfy the requirement, thus the feedback information corresponding to the conversation intention may be obtained based on the external path.

In an example, when the query path shows the external path, a third-party application interface corresponding to the conversation intention and pre-configured by the simulated user may be queried to obtain the feedback information corresponding to the conversation intention. For example, when the interactive object wants to know the weather information, a weather application interface can be queried to obtain the corresponding weather information. For another example, when the interactive object wants to know the stock information, a securities application interface can be queried to obtain the corresponding real-time stock information.

In an example, when the query path shows the external path, a search engine pre-configured by the simulated user can be queried to obtain the feedback information corresponding to the conversation intention. For example, the keyword may be extracted based on the conversation intention, and when the query path shows the external path, the search engine pre-configured by the simulated user may be queried, the keyword can be searched by the search engine to obtain the feedback information corresponding to the conversation intention.

It should be noted that, the foregoing manner of obtaining the feedback information corresponding to the conversation intention based on the query path is exemplary. The feedback information may be obtained in other manners, which is not limited herein.

At block 204, the feedback information is converted into a voice of the simulated user, and the voice is played to the interactive object.

The explanation of the foregoing embodiments for block 103 may also be applicable to that of block 204, and details are not described herein again.

At block 205, an instruction for virtual reality scene interaction is obtained.

The implementation manner of the instruction for virtual reality scene interaction includes, but is not limited to, the voice form, the preset touch track form, the key trigger form, and the like.

At block 206, a 3D user model pre-rendered by the simulated user is invoked, and the 3D user model of the simulated user is presented to the interactive object.

In an embodiment of the present disclosure, the 3D user model of the simulated user may be rendered by the related software for rendering the 3D user model, such that when the instruction for virtual reality scene interaction is obtained, the 3D user model of the simulated user can be presented to the interactive object in the virtual reality scene.

It should be noted that, the simulated user may be presented to the interactive object in the virtual reality scene, or the simulated user may be presented by other means, such as augmented reality technology, which is not limited herein.

At block 207, a plurality of rounds of conversation interaction with the interactive object is reported to the simulated user.

In the embodiment, the robot can intelligently perform a plurality of rounds of conversation interaction with the interactive object, and report the plurality of rounds of conversation interaction to the simulated user.

The robot may report the plurality of rounds of conversation interaction to the simulated user in real time, or the robot may report the plurality of rounds of conversation interaction to the simulated user every preset time.

At block 208, a takeover instruction is received from the simulated user, and the interaction with the interactive object is stopped.

In at least one embodiment, the simulated user may decide whether to send the takeover instruction based on the plurality of rounds of conversation interaction, the robot can receive the takeover instruction sent by the simulated user and stop interacting with the interactive object, and the simulated user can interact with the interactive object.

The implementation manner of the takeover instruction includes, but is not limited to, the voice form, the preset touch track form, the key trigger form, and the like.

In the embodiment, by invoking the 3D user model pre-rendered by the simulated user, the 3D user model of the simulated user can be presented to the interactive object, such that the robot can highly simulate the simulated user in appearance. By reporting the plurality of rounds of conversation interaction with the interactive object to the simulated user, and stopping interacting with the interactive object in response to the reception of the takeover instruction from the simulated user, the simulated user can monitor the robot interaction, and take over the interaction at any time, the functionality of the product can be extended.

Embodiments of the present disclosure further provide an actual application scenario.

Figure 3:
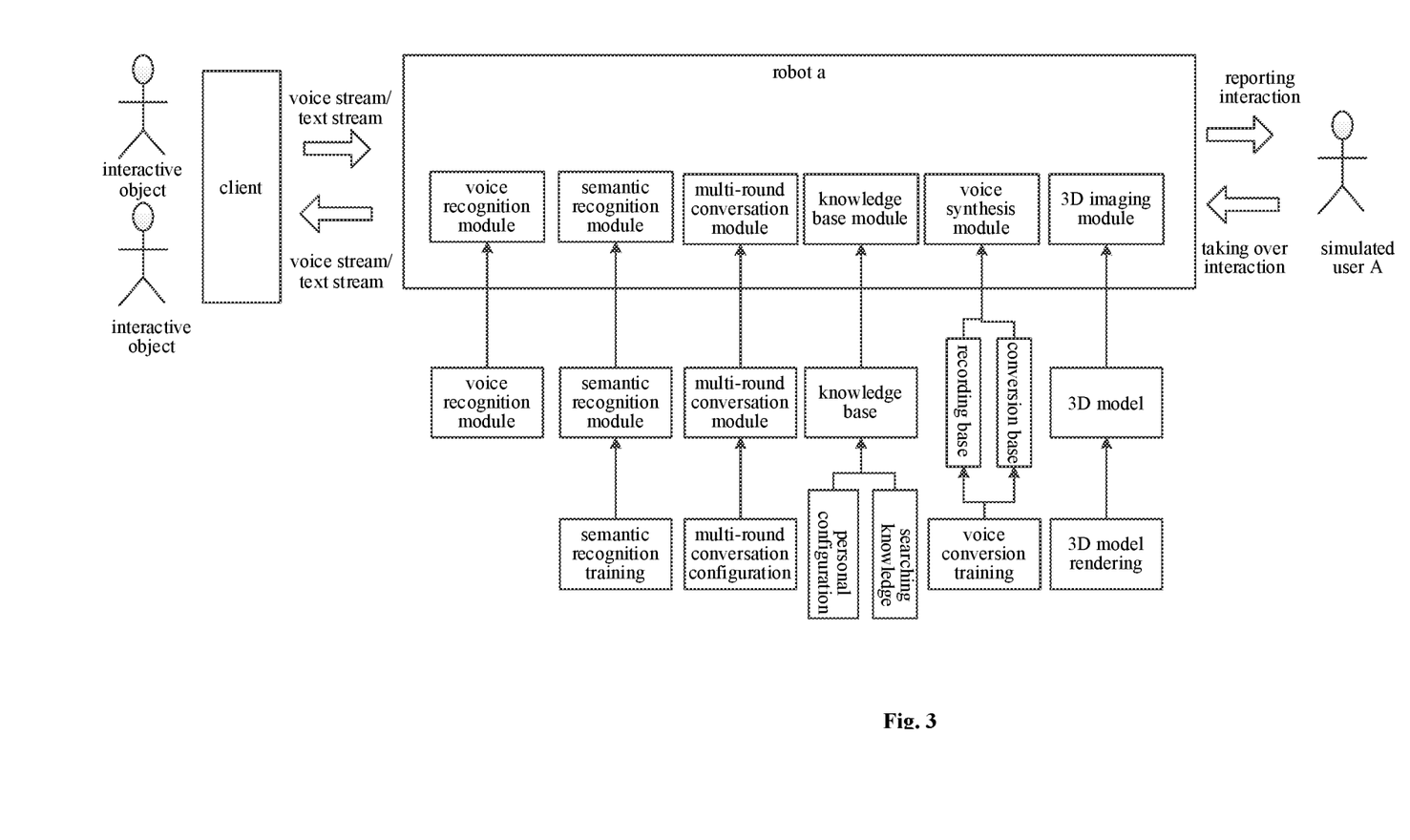
FIG. 3 is a schematic diagram of a practical application of robot interaction according to an embodiment of the present disclosure.

FIG. 3 is a schematic diagram of an application of robot interaction according to an embodiment of the present disclosure. As illustrated in FIG. 3, a robot a simulates a simulated user A to interact with the interactive object.

The robot a includes a voice recognition module, a semantic recognition module, a knowledge base module, a voice synthesis module, a 3D imaging module, and a multi-round conversation module. By training the voice recognition model, the robot a can recognize the voice information input by the interactive object. The simulated user A can train the semantic recognition model according to the scenario required for interaction, such that semantic recognition can be performed on the voice information to obtain the conversation intention. The robot a may retrieve the preset knowledge base based on the conversation intention to obtain the corresponding knowledge, and generate the feedback information. The knowledge base may include content such as the structured knowledge pre-configured by the simulated user A, the rich media knowledge, the third-party application interface desired to be accessed, the knowledge of the non-pre-configured knowledge base, and the like. The robot a can play the feedback information to the interactive object in the voice manner during the interaction process, in which, the converted voice may be the voice of the simulated user A. The voice conversion base of the simulated user A may be trained to support the interaction of the high freedom degree. The voice of the simulated user A may also be recorded and stored in a recording base to support the interaction of the fixed scenario. The 3D imaging module may be configured to pre-render the 3D user model of the simulated user A, so as to present the 3D user model of the simulated user A in the virtual reality scene. The simulated user A may perform the plurality of rounds of conversation configuration, and the robot a can interact with the interactive object based on the plurality of rounds of conversation configuration and the multi-round conversation model.

The interactive object may interact with the robot a through a client. The client includes, but is not limited to, a mobile phone application, a call center, a virtual reality application, an instant messaging application, etc. The robot a can be a physical robot or a virtual robot. The interactive object can send information to the robot a through the voice stream or the text stream, and the robot a can send the feedback information to the interactive object through the voice stream and the text stream, and present the 3D user model of the simulated user A to the interactive object through the image stream. The robot a can report the interaction situation to the simulated user A in real time, and the simulated user A can send the takeover instruction at any time based on the interaction situation, to take over the interaction. The interactive method of a robot according to embodiments of the present disclosure may have various application scenarios, for example, by customizing the robot for stars, the stars can simultaneously interact with the fans, by customizing the robot for teachers, the teachers can teach or answer questions on the Internet, by customizing the robot for migrant workers, the migrant workers can accompany their relatives in the distance, and by customizing the robot for businessmen, the businessmen can deal with trivial matters.

Figure 4:
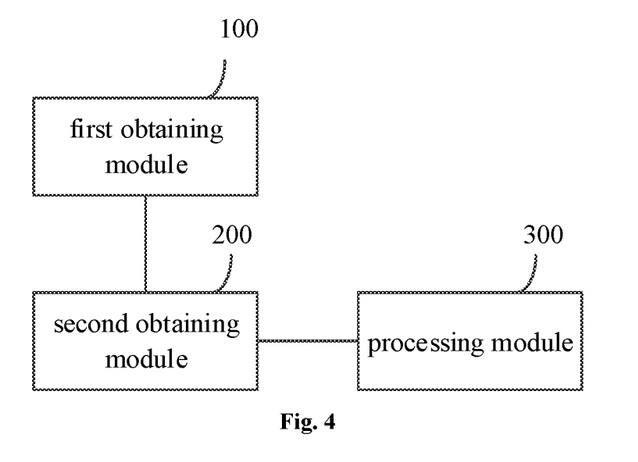
FIG. 4 is a block diagram of an interactive device of a robot according to an embodiment of the present disclosure.

Embodiments of the present disclosure further provides an interactive device of a robot. FIG. 4 is a block diagram of an interactive device of a robot according to an embodiment of the present disclosure, as shown in FIG. 4, the device includes a first obtaining module 100, a second obtaining module 200, and a processing module 300. The first obtaining module 100 is configured to obtain voice information input by an interactive object, and perform semantic recognition on the voice information to obtain a conversation intention. The second obtaining module 200 is configured to obtain feedback information corresponding to the conversation intention based on a conversation scenario knowledge base pre-configured by a simulated user. The processing module 300 is configured to convert the feedback information into a voice of the simulated user, and play the voice to the interactive object.

Furthermore, the second obtaining module 200 is configured to query the conversation scenario knowledge base based on the conversation intention to obtain a query path, and query rich media knowledge pre-configured by the simulated user and/or structured knowledge related to user characteristics and pre-configured by the simulated user to obtain the feedback information corresponding to the conversation intention, when the query path shows a preset path.

Furthermore, the second obtaining module 200 is configured to query a search engine pre-configured by the simulated user or a third-party application interface corresponding to the conversation intention and pre-configured by the simulated user to obtain the feedback information corresponding to the conversation intention, when the query path shows an external path.

Furthermore, the processing module 300 is configured to query a fixed-scenario voice base pre-recorded by the simulated user, obtain an audio file of the feedback information, and play the audio file to the interactive object.

Furthermore, the processing module 300 is configured to query a conversation-scenario voice base pre-trained by the simulated user, generate an audio file of the feedback information based on the feedback information and voice information in the conversation-scenario voice base, and play the audio file to the interactive object.

Figure 5:
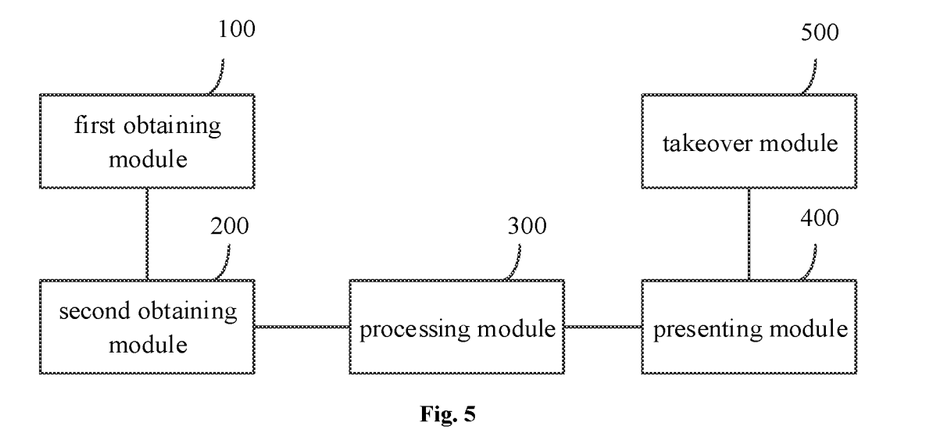
FIG. 5 is a block diagram of an interactive device of a robot according to another embodiment of the present disclosure.

FIG. 5 is a block diagram of an interactive device of a robot according to an embodiment of the present disclosure. On the basis of FIG. 4, the device further includes a presenting module 400 and a takeover module 500.

The presenting module 400 is configured to obtain an instruction for virtual reality scene interaction, invoke a 3D user model pre-rendered by the simulated user, and present the 3D user model of the simulated user to the interactive object.

The takeover module 500 is configured to report a plurality of rounds of conversation interaction with the interactive object to the simulated user, receive a takeover instruction from the simulated user, and stop interacting with the interactive object.

It should be noted that, the description of the interaction method of a robot in the foregoing embodiments may also applicable to the interaction device of a robot of the embodiment, and details are not described herein again.

In view of the above, with the interactive device of a robot according to embodiments of the present disclosure, by obtaining the voice information input by the interactive object, semantic recognition is performed on the voice information to obtain the conversation intention, the feedback information corresponding to the conversation intention is obtained based on the conversation scenario knowledge base pre-configured by the simulated user, and the feedback information is converted into the voice of the simulated user, and the voice is played to the interactive object. Thus, by highly simulating the simulated user in the voice, the conversation manner and the knowledge base, the robot can highly simulate a specific character, and by intelligently recognizing the conversation intention of the interactive object and intelligently obtaining feedback information for feedback, the freedom degree and the intelligence of the robot interaction can be improved.

In at least one embodiment, the present disclosure further provides an electronic device. The electronic device includes a processor and a memory. The processor is configured to run a program corresponding to the executable program codes by reading executable program codes stored in the memory, to perform the interactive method of a robot according to the above embodiments.

In at least one embodiment, the present disclosure further provides a computer program product storing instructions thereon. When the instructions are executed by a processor, cause the processor to implement the interactive method of a robot according to the above embodiments.

In at least one embodiment, the present disclosure further provides a non-transitory computer readable storage medium having stored a computer program thereon. When the computer program is executed by a processor, the interactive method of a robot according to the above embodiments is implemented.

Figure 6:
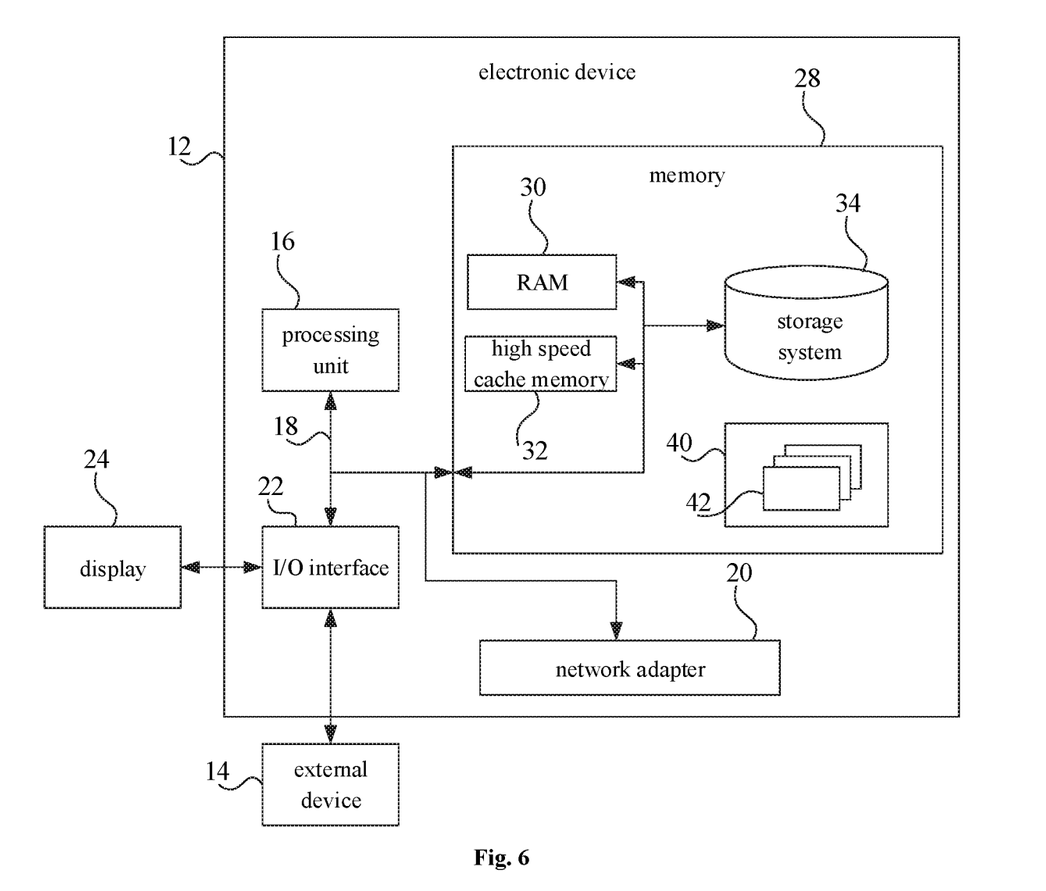
FIG. 6 is a schematic diagram of an electronic device according to an embodiment of the present disclosure.

FIG. 6 illustrates a block diagram of an exemplary electronic device suitable for realizing implementations of the present disclosure. The electronic device 12 illustrated in FIG. 6 is merely an example, which should be not understood to limit he functions and usage scope of embodiments of the present disclosure.

As illustrated in FIG. 6, the electronic device 12 may be represented in the form of a general-purpose computing device. Components of the electronic device 12 may include, but is not limited to, one or more processors or processing units 16, a system memory 28, and a bus 18 connecting various system components including the system memory 28 and the processing units 16.

The bus 18 represents one or more of several types of bus structures, including a memory bus or a memory controller, a peripheral bus, a graphics acceleration port, a processor, or a local bus using any of a variety of bus structures. For example, these architectures include, but are not limited to, an Industry Standard Architecture (hereinafter referred to as ISA) bus, a Micro Channel Architecture (hereinafter referred to as MAC) bus, an enhanced ISA bus, a Video Electronics Standards Association (hereinafter referred to as VESA) local bus and Peripheral Component Interconnection (PCI) bus.

The electronic device 12 typically includes a variety of computer system readable media. These media may be any available media accessible by the electronic device 12 and includes both volatile and non-volatile media, removable and non-removable media.

The system memory 28 may include a computer system readable medium in the form of volatile memory, such as a random-access memory (hereinafter referred to as RAM) 30 and/or a high-speed cache memory 32. The electronic device 12 may further include other removable or non-removable, volatile or non-volatile computer system storage media. By way of example only, the storage system 34 may be configured to read and write a non-removable and non-volatile magnetic media (not shown in FIG. 6, commonly referred to as a "hard drive"). Although not shown in FIG. 6, a magnetic disk driver for reading from and writing to a removable and non-volatile magnetic disk (such as "floppy disk") and a disk driver for a removable and non-volatile optical disk (such as compact disk read only memory (hereinafter referred to as CD-ROM), Digital Video Disc Read Only Memory (hereinafter referred to as DVD-ROM) or other optical media) may be provided. In these cases, each driver may be connected to the bus 18 via one or more data medium interfaces. The memory 28 may include at least one program product. The program product has a set (such as, at least one) of program modules configured to perform the functions of various embodiments of the present disclosure.

A program/utility 40 having a set (at least one) of the program modules 42 may be stored in, for example, the memory 28. The program modules 42 include but are not limited to, an operating system, one or more application programs, other programs modules, and program data. Each of these examples, or some combination thereof, may include an implementation of a network environment. The program modules 42 generally perform the functions and/or methods in the embodiments described herein.

The electronic device 12 may also communicate with one or more external devices 14 (such as, a keyboard, a pointing device, a display 24, etc.). Furthermore, the electronic device 12 may also communicate with one or more communication devices enabling a user to interact with the electronic device 12 and/or other devices (such as a network card, modem, etc.) enabling the electronic device 12 to communicate with one or more computer system/servers. This communication can be performed via the input/output (I/O) interface 22. Also, the electronic device 12 may communicate with one or more networks (such as a local area network (hereafter referred to as LAN), a wide area network (hereafter referred to as WAN) and/or a public network such as an Internet) through a network adapter 20. As shown in FIG. 6, the network adapter 20 communicates with other modules of the electronic device 12 over the bus 18. It should be understood that, although not shown in FIG. 6, other hardware and/or software modules may be used in connection with the electronic device 12. The hardware and/or software includes, but is not limited to, microcode, device drivers, redundant processing units, external disk drive arrays, RAID systems, tap Drive and data backup storage system.

The processing unit 16 is configured to execute various functional applications and data processing by running programs stored in the system memory 28, for example, implementing the method according to the above embodiments.

In the description of the present disclosure, it should be understood that, terms such as "first" and "second" are used herein for purposes of description and are not intended to indicate or imply relative importance or significance. Thus, the feature defined with "first" and "second" may include one or more this feature. In the description of the present disclosure, unless specified otherwise "a plurality of" means at least two, such as two or three.

Reference throughout this specification to "an embodiment," "some embodiments," "an example," "a specific example," or "some examples," means that a particular feature, structure, material, or characteristic described in connection with the embodiment or example is included in at least one embodiment or example of the present disclosure. The appearances of the above phrases in various places throughout this specification are not necessarily referring to the same embodiment or example of the present disclosure. Furthermore, the particular features, structures, materials, or characteristics may be combined in any suitable manner in one or more embodiments or examples. In addition, different embodiments or examples and features of different embodiments or examples described in the specification may be combined by those skilled in the art without mutual contradiction.

Although embodiments of present disclosure have been shown and described above, it should be understood that above embodiments are just explanatory, and cannot be construed to limit the present disclosure, for those skilled in the art, changes, alternatives, and modifications can be made to the embodiments without departing from spirit, principles and scope of the present disclosure.

What is claimed is:
1. An interactive method for a robot, comprising:
during the robot simulating a simulated user to interact with an interactive object, obtaining voice information input by the interactive object, and performing semantic recognition on the voice information to obtain a conversation intention;
obtaining feedback information corresponding to the conversation intention based on a conversation scenario knowledge base pre-configured by the simulated user; and
converting the feedback information into a voice of the simulated user, and playing the voice to the interactive object;
wherein converting the feedback information into the voice of the simulated user comprises:
querying a voice base comprising at least one of a fixed-scenario voice base pre-recorded by the simulated user or a conversation-scenario voice base pre-trained by the simulated user, wherein the fixed-scenario voice base stores the voice audio file of the simulated user for the conversation scenario, and the conversation-scenario voice base is obtained by training voice segments of the simulated user;
obtaining or generating an audio file of the feedback information based on the feedback information and voice information in the voice base; and
playing the audio file to the interactive object;
wherein, obtaining the feedback information corresponding to the conversation intention based on the conversation scenario knowledge base pre-configured by the simulated user comprises:
querying the conversation scenario knowledge base based on the conversation intention, to obtain a query path matching with the conversation intention, wherein, the conversation scenario knowledge base is provided with query paths, the query paths comprises a preset path and an external path, the conversation intention is compared with the query paths to obtain the query path matching with the conversation intention, querying is performed through the external path in response to knowledge queried through the preset path not meeting requirements;
obtaining the feedback information corresponding to the conversation intention based on the matched query path;
wherein obtaining the feedback information corresponding to the conversation intention based on the matched query path comprises:
when the query path shows the preset path, querying rich media knowledge pre-configured by the simulated user and/or structured knowledge related to user characteristics and pre-configured by the simulated user, to obtain the feedback information corresponding to the conversation intention;
when the query path shows the external path, querying a search engine pre-configured by the simulated user or a third-party application interface corresponding to the conversation intention and pre-configured by the simulated user, to obtain the feedback information corresponding to the conversation intention.

2. The method according to claim 1, further comprising:
obtaining an instruction for virtual reality scene interaction;
invoking a 3D user model pre-rendered by the simulated user; and
presenting the 3D user model of the simulated user to the interactive object.

3. The method according to claim 1, further comprising:
reporting a plurality of rounds of conversation interaction with the interactive object to the simulated user;
receiving a takeover instruction from the simulated user; and
stopping interacting with the interactive object.

4. An electronic device, comprising:
a memory;
a processor;
wherein the processor is configured to run a program corresponding to the executable program codes by reading executable program codes stored in the memory, to:
during the robot simulating a simulated user to interact with an interactive object, obtain voice information input by the interactive object, and perform semantic recognition on the voice information to obtain a conversation intention;
obtain feedback information corresponding to the conversation intention based on the conversation scenario knowledge base pre-configured by a simulated user; and
convert the feedback information into a voice of the simulated user, and play the voice to the interactive object;
wherein, the processor is configured to:
query a voice base comprising at least one of a fixed-scenario voice base pre-recorded by the simulated user or a conversation-scenario voice base pre-trained by the simulated user, wherein the fixed-scenario voice base stores the voice audio file of the simulated user for the conversation scenario, and the conversation-scenario voice base is obtained by training voice segments of the simulated user;
obtain or generating an audio file of the feedback information based on the feedback information and voice information in the voice base; and
play the audio file to the interactive object;
wherein the processor is configured to:
query the conversation scenario knowledge base based on the conversation intention, to obtain a query path matching with the conversation intention, wherein the conversation scenario knowledge base is provided with query paths, the query path comprises a preset path and an external path, the conversation intention is compared with the query paths to obtain the query path matching with the conversation intention, querying is performed through the external path in response to knowledge queried through the preset path not meeting requirements;
obtain the feedback information corresponding to the conversation intention based on the matched query path;
wherein the processor is configured to:
when the query path shows the preset path, query rich media knowledge pre-configured by the simulated user and/or structured knowledge related to user characteristics and pre-configured by the simulated user, to obtain the feedback information corresponding to the conversation intention;
when the query path shows the external path, query a search engine pre-configured by the simulated user or a third-party application interface corresponding to the conversation intention and pre-configured by the simulated user, to obtain the feedback information corresponding to the conversation intention.

5. The electronic device according to claim 4, wherein the processor is further configured to:
obtain an instruction for virtual reality scene interaction;

invoke a 3D user model pre-rendered by the simulated user; and present the 3D user model of the simulated user to the interactive object.

6. The electronic device according to claim 4, wherein the processor is further configured to:

report a plurality of rounds of conversation interaction with the interactive object to the simulated user;

receive a takeover instruction from the simulated user; and stop interacting with the interactive object.

7. A non-transitory computer readable storage medium having stored a computer program thereon that, when executed by a processor, implements an interactive method of a robot, the method comprising:

during the robot simulating a simulated user to interact with an interactive object, obtaining voice information input by the interactive object, and performing semantic recognition on the voice information to obtain a conversation intention;

obtaining feedback information corresponding to the conversation intention based on a conversation scenario knowledge base pre-configured by the simulated user; and converting the feedback information into a voice of the simulated user, and playing the voice to the interactive object;

wherein converting the feedback information into the voice of the simulated user comprises:

querying a voice base comprising at least one of a fixed-scenario voice base pre-recorded by the simulated user or a conversation-scenario voice base pre-trained by the simulated user, wherein the fixed-scenario voice base stores the voice audio file of the simulated user for the conversation scenario, and the conversation-scenario voice base is obtained by training voice segments of the simulated user;

obtaining or generating an audio file of the feedback information based on the feedback information and voice information in the voice base; and playing the audio file to the interactive object;

wherein obtaining the feedback information corresponding to the conversation intention based on the conversation scenario knowledge base pre-configured by the simulated user comprises:

querying the conversation scenario knowledge base based on the conversation intention, to obtain a query path matching with the conversation intention, wherein the conversation scenario knowledge base is provided with query paths, the query path comprises a preset path and an external path, the conversation intention is compared with the query paths to obtain the query path matching with the conversation intention, querying is performed through the external path in response to knowledge queried through the preset path not meeting requirements;

obtaining the feedback information corresponding to the conversation intention based on the matched query path;

wherein obtaining the feedback information corresponding to the conversation intention based on the matched query path comprises:

when the query path shows the preset path, querying rich media knowledge pre-configured by the simulated user and/or structured knowledge related to user characteristics and pre-configured by the simulated user, to obtain the feedback information corresponding to the conversation intention;

when the query path shows the external path, querying a search engine pre-configured by the simulated user or a third-party application interface corresponding to the conversation intention and pre-configured by the simulated user, to obtain the feedback information corresponding to the conversation intention.

8. The non-transitory computer readable storage medium according to claim 7, wherein the method further comprises:

obtaining an instruction for virtual reality scene interaction;

invoking a 3D user model pre-rendered by the simulated user; and presenting the 3D user model of the simulated user to the interactive object.

9. The non-transitory computer readable storage medium according to claim 7, wherein the method further comprises:

reporting a plurality of rounds of conversation interaction with the interactive object to the simulated user;

receiving a takeover instruction from the simulated user; and stopping interacting with the interactive object.

* * * * *